(12) United States Patent
Adimatyam et al.

(10) Patent No.: US 8,959,539 B2
(45) Date of Patent: Feb. 17, 2015

(54) MESSAGE DELIVERY MECHANISM

(75) Inventors: Venkata S. Adimatyam, Irving, TX (US); Sameer Vasant Gavade, Irving, TX (US); Enrique Ruiz-Velasco, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 235 days.

(21) Appl. No.: 13/249,726

(22) Filed: Sep. 30, 2011

(65) Prior Publication Data

US 2013/0086601 A1    Apr. 4, 2013

(51) Int. Cl.
*H04N 7/16*         (2011.01)
*H04N 21/2543*      (2011.01)
*H04N 21/234*       (2011.01)
*H04N 21/81*        (2011.01)
*H04N 21/845*       (2011.01)

(52) U.S. Cl.
CPC ..... *H04N 21/2543* (2013.01); *H04N 21/23424* (2013.01); *H04N 21/812* (2013.01); *H04N 21/8456* (2013.01)

USPC ........ 725/1; 725/14; 725/22; 725/32; 725/44; 725/47; 725/52

(58) Field of Classification Search
USPC .......................... 725/1, 14, 22, 32, 44, 47, 52
See application file for complete search history.

(56) References Cited

U.S. PATENT DOCUMENTS

2005/0039205 A1* 2/2005 Riedl .............................. 725/32
2009/0178089 A1* 7/2009 Picco et al. .................... 725/87

* cited by examiner

*Primary Examiner* — Jivka Rabovianski

(57) ABSTRACT

A method may include receiving a video stream, wherein the video stream is divided into video segments, and wherein the video stream is being sent to a customer device and receiving a request to insert a message into the video stream. The method may further include determining a particular video segment after which to insert the message into the video stream; inserting the message into video stream after the particular video segment; and sending the video stream to the customer device, wherein the video stream includes the inserted message.

20 Claims, 10 Drawing Sheets

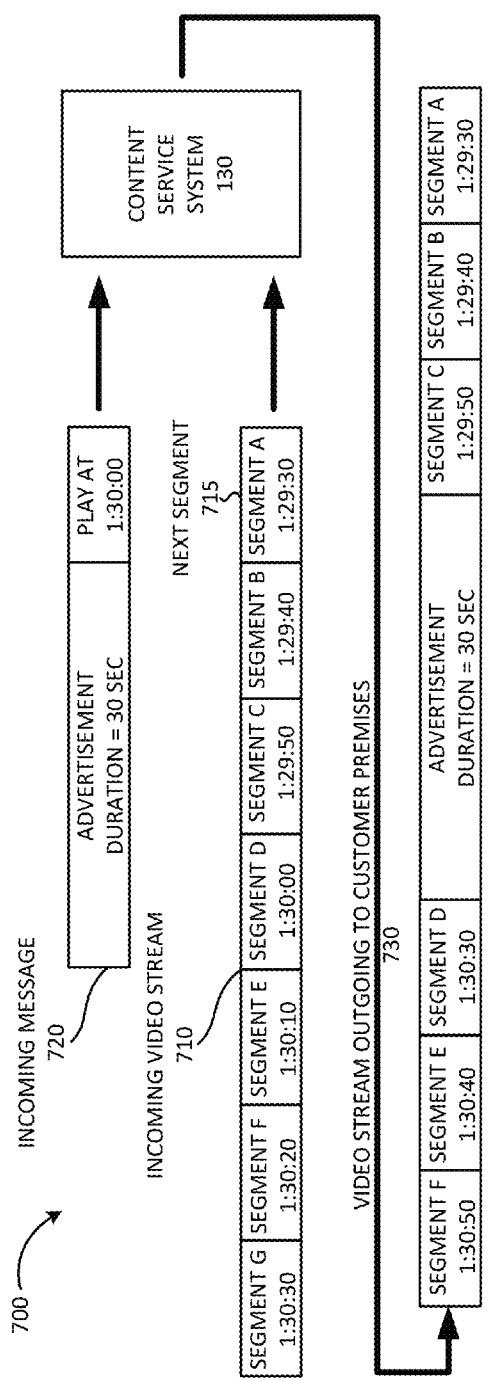
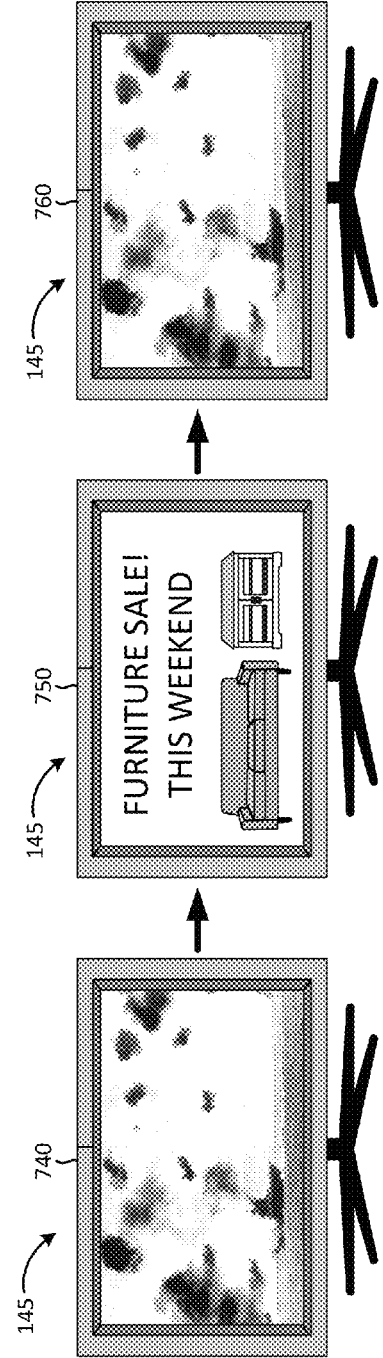
FIG. 7A
FIG. 7B

770 ⟶

```
#EXTM3U
#EXTINF – video4357, Battle of Midway  ⟵ 772
#EXT-X-TARGETDURATION:10
.
.
.
#EXTINF:segment A
129.0.0.342/content/type12/2011/4357-210.ts  ⟵ 774
#EXTINF-segment B
129.0.0.342/content/type12/2011/4357-211.ts
#EXTINF:segment C
129.0.0.342/content/type12/2011/4357-212.ts
#EXTINF-segment D
129.0.0.342/content/type12/2011/4357-213.ts
#EXTINF-segment E
129.0.0.342/content/type12/2011/4357-214.ts
#EXTINF:segment F
129.0.0.342/content/type12/2011/4357-215.ts
#EXTINF-segment G
129.0.0.342/content/type12/2011/4357-216.ts
.
.
```

```
.
.
#EXTINF:segment A
129.0.0.342/content/type12/2011/4357-210.ts  ⟵ 774
#EXTINF-segment B
129.0.0.342/content/type12/2011/4357-211.ts
#EXTINF:segment C
129.0.0.342/content/type12/2011/4357-212.ts
#EXTINF: ad7804 – segment 1
151.6.19.0/ads/client65/campaign3/ad43-1.ts  ⟵ 776
#EXTINF: ad7804 – segment 2
151.6.19.0/ads/client65/campaign3/ad43-2.ts
#EXTINF-segment D
129.0.0.342/content/type12/2011/4357-213.ts
#EXTINF-segment E
129.0.0.342/content/type12/2011/4357-214.ts
.
.
```

FIG. 7D

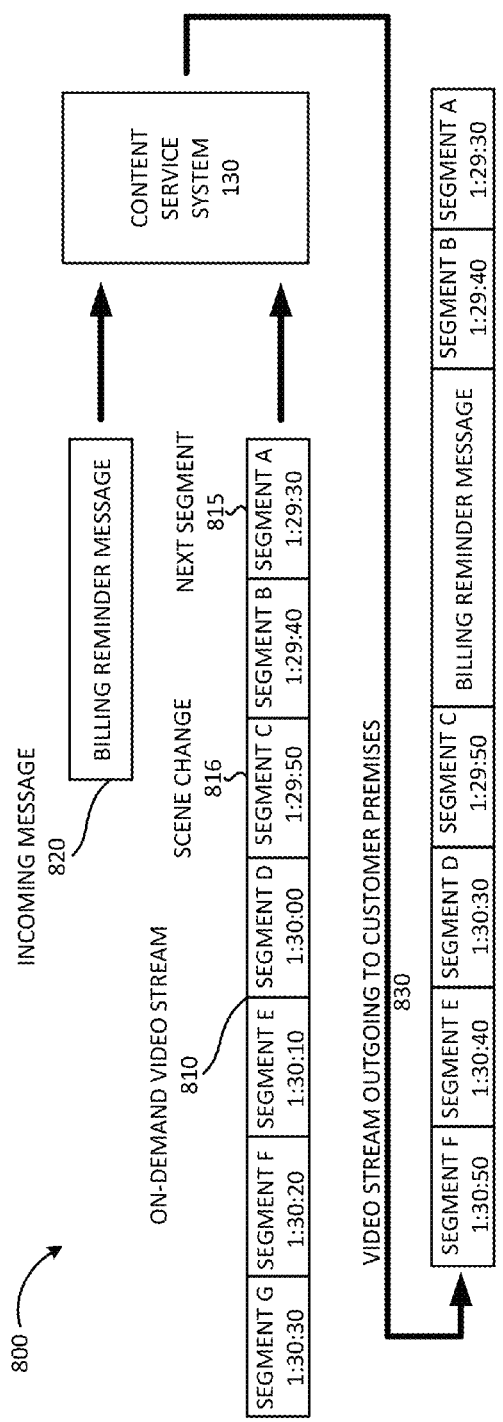
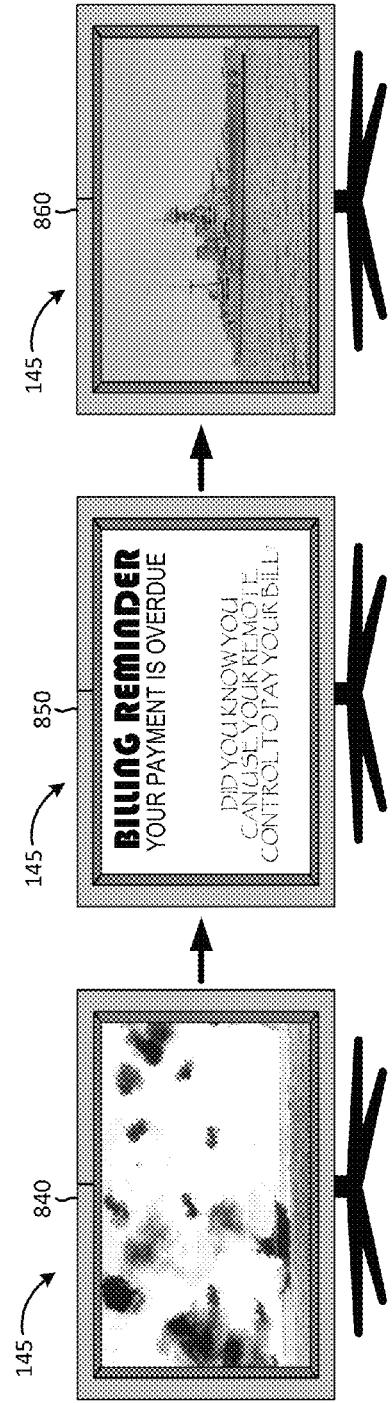
FIG. 8A
FIG. 8B

MESSAGE DELIVERY MECHANISM

BACKGROUND INFORMATION

Video content may be available from content providers, such as a commercial broadcasting television network (e.g., ABC, CBS, NBC, FOX, etc.); a cable television network (e.g., CNN, TNT, TBS, etc.); a satellite television network (e.g. DirectTV, Dish Network, etc.); a pay-per-view service; an on-demand video service; an Internet content provider (e.g., Hulu, Veoh, Jaman, YouTube, etc.); and/or from any other commercial supplier (e.g., iTunes, Netflix, Blockbuster, etc.). The video content may be delivered to customer premises over a connection provided by a service provider as part of a subscription service. The video content may be delivered to the service provider from the content provider as a video stream delivered in video segments.

BRIEF DESCRIPTION OF THE DRAWINGS

FIGS. 7A-D are diagrams of a first exemplary of providing a message via a video stream according to an implementation described herein;

FIGS. 8A-8B are diagrams of a second exemplary of providing a message via a video stream according to an implementation described herein.

DETAILED DESCRIPTION OF PREFERRED EMBODIMENTS

The following detailed description refers to the accompanying drawings. The same reference numbers in different drawings identify the same or similar elements.

Advertisements may be inserted into a video stream at locations specified by Society of Cable Telecommunications Engineers (SCTE) 35 specification message cues. An SCTE-35 message cue may indicate a location in a video stream where another media stream may be inserted or spliced into the video stream. One example of an SCTE-35 message cue may include a SCTE-35 "can override" message, which may indicate advertisements in a video stream that can be overwritten with local advertisements. Dependency on SCTE-35 cue messages may be limiting.

An implementation described herein may relate to inserting a message into a content stream, such as, for example, inserting an advertisement into a video stream being sent to a customer, independently of SCTE-35 message cues. A content stream may be received by a service provider in content segments and the content segments may be provided by the service provider to a customer device. When the service provider determines that a message is to be inserted into the content stream, the service provider may determine a particular content segment after which the message is to be inserted, may pause the content stream after the particular content segment is sent to the customer device, may insert the message into the content stream, and may resume sending of the content stream at a next content segment after the message has been inserted. Messages which may be inserted into a content stream may include advertisements, messages from a billing system, messages from a service and/or maintenance system, public and/or emergency announcements, messages from one customer to another customer, and/or any other type of messages that may be sent by a service provider to a customer.

The term "content," as used herein, may include video content (e.g., a video stream), audio content (e.g., an audio stream), and/or textual content (e.g., a textual stream). Furthermore, video content may include video on demand (VOD) content, pay-per-view (PPV) video content, rented video content, free television content (e.g., from free television broadcasters, etc.), paid for television content (e.g., from pay television content providers), on-line video content (e.g., on-line television programs, movies, videos, etc.), advertising, games, music videos, promotional information (e.g., such as previews, trailers, etc.), etc. Furthermore, the term "stream" may refer to a real-time streaming process, an on-demand streaming process, and/or a progressive download process.

Figure 1:
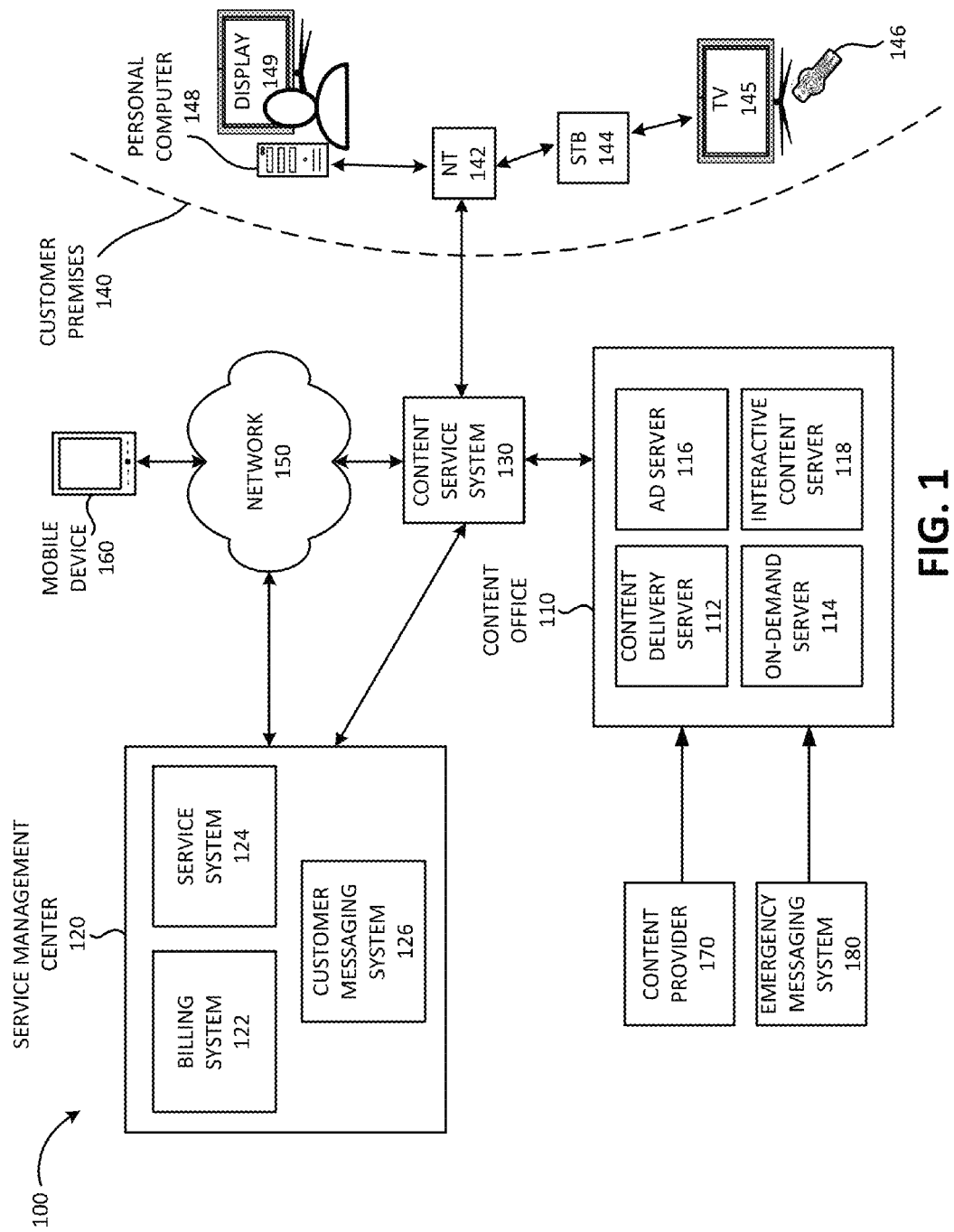
FIG. 1 is a diagram illustrating an exemplary environment according to an implementation described herein.

FIG. 1 is a diagram of an exemplary environment 10 in which the systems and/or methods described herein may be implemented. As shown in FIG. 1, environment 100 may include a content office 110, a service management center 120, a content service system 130, customer premises 140, a network 150, a mobile device 160, a content provider 170, and an emergency messaging system 180.

Content office 110 may include one or more devices, such as server devices, that ingest content, store content, and/or deliver content to customer premises 140 and/or mobile device 160 via content service system 130. Furthermore, content office 110 may receive requests for content from customer premises 140 and/or mobile device 160. While content office 110 is illustrated in FIG. 1 as connecting to a single customer premises 140 for explanatory purposes, in practice, content office 110 may connect to multiple customer premises 140 (and/or to multiple mobile devices 160). Furthermore, environment 100 may include multiple content offices 110. For example, a particular content office 110 may serve a large number of customer premises 140 located within a particular geographic area. Content office 110 may include a content delivery server 112, an on-demand server 114, an ad server 116, and an interactive content server 118.

Content delivery server 112 may include one or more devices, such as server devices, that provide television broadcasts (e.g., broadcasts from a local network such as ABC, CBS, NBC, FOX, etc.); cable television network broadcasts (e.g., broadcasts from a network such as CNN, TNT, TBS, etc.); satellite television broadcasts (e.g., broadcasts from a network such as DirectTV, Dish Network, etc.); pay-per-view service broadcasts; and/or other types of television broadcasts.

On-demand server 114 may include one or more devices, such as server devices, that store and provide content on demand. For example, on-demand server 114 may include a catalog of content that may be accessed by a customer using, for example, STB 144 in connection with remote control 146 or by using personal computer 148. The customer may select a particular content (e.g., a movie) to purchase and on-demand server 114 may stream the purchased content to customer premises 140 (and/or to mobile device 160) when the customer selects to consume the purchased content.

Ad server 116 may include one or more devices, such as server devices, that store, manage, select, and provide advertisements to be presented with other content. For example, ad server 116 may receive an advertisement from a sponsor, may categorize the advertisement based on one or more parameters, and may select to provide the advertisement to customer premises 140 and/or mobile device 160 in connection with particular content (e.g., particular content provided by content delivery server 112, on-demand server 114, and/or interactive content server 118).

Interactive content server 118 may include one or more devices, such as server devices, that serve and manage interactive content (e.g., any form of content with which a customer can interact). For example, interactive content may include an interactive program guide, a food ordering service, interactive advertisements, weather or traffic information, games, etc. Interactive content may be stored as, for example, ETV applications and resources, Lua applications, and/or JavaScript applications.

Service management center 120 may include one or more devices, such as server devices, that perform services relating to customer accounts associated with content service system 130. Service management center 120 may include a billing system 122, a service system 124, and a customer messaging system 126.

Billing system 122 may include one or more devices, such as server devices, that compute charges for an account associated with a customer and that generate a bill for the customer at particular intervals. Billing system 122 may communicate with devices associated with customer premises 140, and/or with mobile device 160, regarding a charge and/or a bill associated with the customer. For example, billing system 122 may generate a billing reminder and content service system 130 may insert the billing reminder into a video stream being sent to a device associated with customer premises 140, and/or being sent to mobile device 160.

Service system 124 may include one or more devices, such as server devices, that perform service and/or maintenance operations associated with customer premises 140 and/or mobile device 160. For example, service system 124 may check a status of a device associated with environment 100, may perform a software update, may schedule a maintenance event, may dispatch service personnel to customer premises 140, may request particular information from a device associated with customer premises 140 and/or from mobile device 160, and/or may perform any other service or maintenance operation. Service system 124 may communicate with devices associated with customer premises 140, and/or with mobile device 160, regarding a service or maintenance announcement and/or request. For example, service system 124 may generate a service or maintenance announcement and content service system 130 may insert the service or maintenance announcement into a video stream being sent to a device associated with customer premises 140, and/or to mobile device 160.

Customer messaging system 126 may include one or more devices, such as server devices, that enable customers to communicate with each other. For example, a first customer may send a text, audio, or video message to a second customer from personal computer 148, TV 145 (e.g., using remote control 146), or mobile device 160. For example, the first customer may select the second customer as the recipient of a message from a list of contacts stored on the first customer's device. The message may be received by content service system 130 and forwarded to customer messaging system 126. Customer messaging system 126 may identify the second customer based on information included in the message and may send the message to content service system 130 to be provided to the second customer. Content service system 130 may identify a video stream being sent to the second customer and may insert the message into the video stream being sent to the second customer.

Content service system 130 may include one or more devices, such as server devices, that connect to customer premises 140 via network terminal (NT) 142 and may communicate with mobile device 160 via network 150. Content service system 130 may deliver content to customer premises 140 and/or mobile device 160 from content office 110 and/or may receive data from customer premises 140 and/or from mobile device 160 and may forward the data to a particular destination in environment 100. Content service system 130 may include one or more devices for transcoding and/or multiplexing content from different sources for delivery to customer premises 140 and/or mobile device 160. For example, content service system 130 may insert an advertisement, a message from service management center 120, or a message from EAS system 180 into a video stream being sent to customer premises 140 and/or mobile device 160.

Customer premises 140 may include a particular location (or multiple locations) associated with a customer. For example, customer premises 140 may include the customer's home. Devices associated with customer premises 140, as well as mobile device 160, may receive content, such as video content, via content service system 130. Devices associated with customer premises 140, as well as mobile device 160, may be considered "user devices" and/or "network devices." Customer premises 140 may include an NT 142, a set top box (STB) 144, a television 145, a remote control 146, a personal computer 148, and a display 149.

NT 142 may receive content from content service system 130 via a connection, such as, for example, via a fiber optic cable connection, a coaxial cable connection, a wireless connection, and/or another type of connection. Furthermore, NT 142 may send information from a device associated with customer premises 140 to content service system 130. In one implementation, NT 142 may include an optical network terminal and NT 142, content office 110, service management center 120, and/or content service system 130 may form part of a high-speed fiber optic network (e.g., FiOS™). In another implementation, NT 142 may include a cable modem. In yet another implementation, NT 142 may include a fixed wireless transceiver. Additionally or alternatively, NT 142 may include a layer 2 and/or layer 3 network device, such as a switch, router, firewall, and/or gateway. Customer premises 140 may receive one or more services via the connection between NT 142 and content service system 130, such as, for example, a television service, Internet service, and/or voice communication (e.g., telephone) service.

STB 144 may receive content and output the content to television 145 for display. STB 144 may include a component (e.g., a cable card or a software application) that interfaces with (e.g., plugs into) a host device (e.g., a personal computer, television 145, a stereo system, etc.) and allows the host device to display content. STB 144 may also be implemented as a home theater personal computer (HTPC), an optical disk player (e.g., digital video disk (DVD) or Blu-Ray™ disc player), a cable card, etc. STB 144 may receive commands and/or other type of data from other devices, such as remote control 146, and may transmit the data to other devices in environment 100, such as, for example, content service system 130.

Television 145 may output content received from STB 144. Television 145 may include speakers as well as a display. Remote control 146 may issue wired or wireless commands for controlling other electronic devices, such as television 145 and/or STB 144. Remote control 146, in conjunction with STB 144, may allow a customer to interact with an application running on STB 144, such as an application configured to send a message to another customer. Other types of devices (e.g., a keyboard, mouse, mobile phone, etc.) may be used instead of, or in addition to, remote control 146, in order to control television 145 and/or STB 144.

Personal computer 148 may include a desktop computer, a laptop computer, a tablet computer, a mobile communication device, a personal digital assistant (PDA), or another type of computation and/or communication device. Personal computer 148 may include a microphone to capture audio, a camera to capture images or video. Personal computer 148 may include display 149 for displaying images and/or video content received from content service system 130. Personal computer 148 may also include a speaker for playing audio signals.

Network 150 may include one or more wired and/or wireless networks. For example, network 150 may include a cellular network, the Public Land Mobile Network (PLMN), a second generation (2G) network, a third generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a combination of thereof, and/or another type of wireless network. Additionally, or alternatively, network 150 may include a local area network (LAN), a wide area network (WAN), a metropolitan area network (MAN), an ad hoc network, an intranet, a fiber optic-based network (e.g., a fiber optic service (FiOS) network), a television network, and/or a combination of these or other types of networks. Network 150 may enable content service system 150 to communicate with mobile device 160 and/or with service management center 120.

Mobile device 160 may include a mobile communication device, such as a mobile phone, a smart phone, a tablet computer, a laptop, a PDA, or another type of portable communication device. Mobile device 160 may receive content, such as a video stream, from content service system 130 via network 150. In one embodiment, mobile device 160 may be associated with a customer account associated with customer premises 140. In another embodiment, mobile device 160 need not be associated with customer premises 140.

Content provider 170 may include one or more devices, such as server devices, that provide content to content office 110. For example, content provider 170 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., Youtube, Vimeo, Netflix, Hulu, Veoh, etc.) that stream content from web sites and/or permit content to be downloaded (e.g., via progressive download, etc.). Content provider 170 may include on-demand content providers (e.g., video on demand (VOD), pay per view (PPV), etc.).

Emergency messaging system 180 may include one or more devices, such as server devices, that are associated with a warning system responsible for warning the public about an emergency. For example, emergency messaging system 180 may generate a warning message about a local or regional weather event (e.g., tornado, flash flood, blizzard, etc.), a warning message about a national emergency received from the emergency alert system (EAS), and/or any other type of public announcement.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
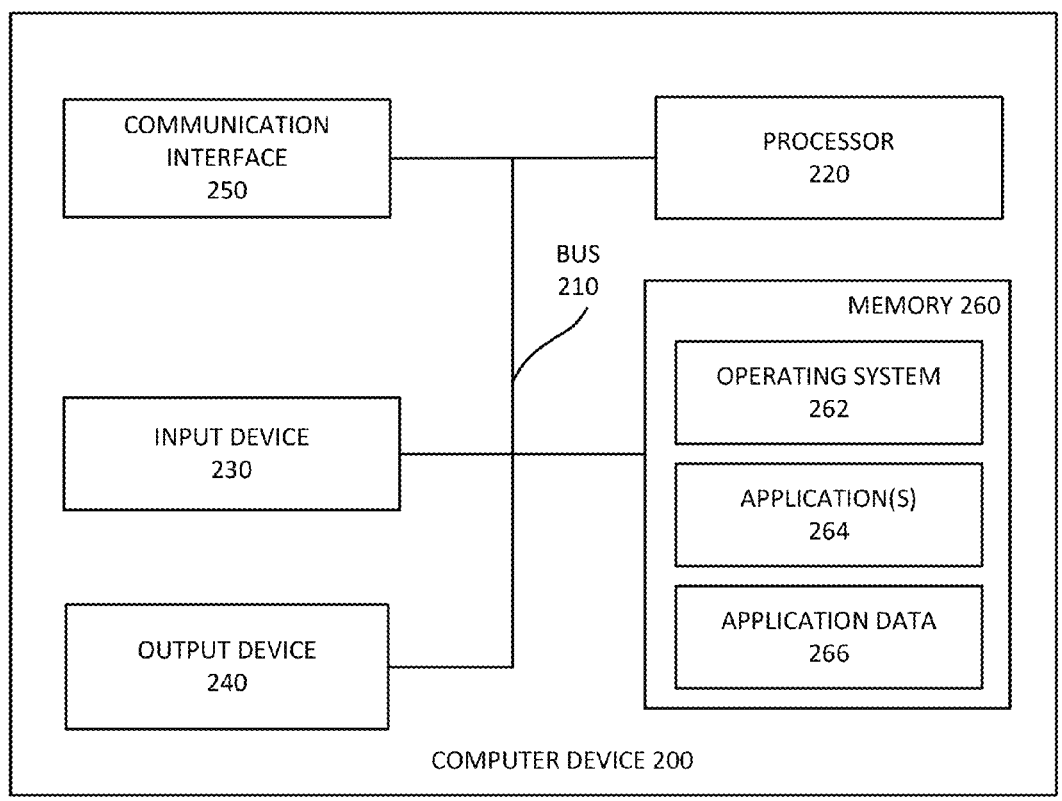
FIG. 2 is a diagram illustrating exemplary components associated with the content service system of FIG. 1.

Devices in environment 100 may include one or more computer devices. FIG. 2 is a diagram of exemplary components of a computer device 200 that may be included in any of the devices of environment 100. As shown in FIG. 2, computer device 200 may include a bus 210, processor 220, an input device 230, an output device 240, a communication interface 250, and a memory 260. Computer device 200 may include other components (not shown) that aid in receiving, transmitting, and/or processing data. Moreover, other configurations of components in computer device 200 are possible.

Bus 210 may include a path that permits communication among the components of computer device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit.

Input device 230 may allow a customer to input information into computer device 200. Input device 230 may include, for example, a keyboard, a mouse, a pen, a microphone, a remote control (e.g., remote control 146), an audio capture device, an image and/or video capture device, a touch-screen display, and/or another type of input device. In some embodiments, some devices in environment 100, such as servers in content office 110, may be managed remotely and may not include input device 230. In other words, some devices may be "headless" and may not include a keyboard, for example.

Output device 240 may output information to the customer. Output device 240 may include a display, a printer, a speaker, and/or another type of output device. For example, television 145 and/or personal computer 148 may include a display, which may include a liquid-crystal display (LCD) for displaying content to the customer. As another example, NT 142 and STB 144 may include one or more light-emitting diodes (LEDs). In some embodiments, some devices in environment 100, such as servers in content office 110, may be managed remotely and may not include output device 240. In other words, some devices may be "headless" and may not include a display, for example.

Input device 230 and output device 240 may allow a customer to activate and interact with a particular service or application, such as receiving a message in a content stream from content service system 130, responding to the message, or generating a message to be sent via content service system 130.

Communication interface 250 may include a transceiver that enables computer device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 250 may include a transmitter that converts baseband signals to radio frequency (RF) signals and/or a receiver that converts RF signals to baseband signals. Communication interface 250 may be coupled to an antenna for transmitting and receiving RF signals.

Communication interface 250 may include a logical component that includes input and/or output ports, input and/or output systems, and/or other input and output components that facilitate the transmission of data to other devices. For example, communication interface 250 may include a network interface card (e.g., Ethernet card) for wired communications and/or a wireless network interface (e.g., a WiFi) card for wireless communications. Communication interface 250 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Memory 260 may include any type of dynamic storage device that may store information and/or instructions, for execution by processor 220, and/or any type of non-volatile storage device that may store information for use by processor 220. For example, memory 260 may include a random access memory (RAM) or another type of dynamic storage device, a read-only memory (ROM) device or another type of static storage device, a content addressable memory (CAM), and/or some other type of magnetic or optical recording medium and its corresponding drive (e.g., a hard disk drive). Memory 260 may include an operating system 262, one or more application(s) 264, and application data 266.

Operating system 262 may include software instructions for managing hardware and software resources of computer device 200. For example, operating system 262 may include Linux, Solaris, Windows, OS X, iOS, Android, an embedded operating system, and/or any other type of operating system. Applications 264 and application data 266 may provide network services or include applications, depending on the device of environment 100 in which the particular computer device 200 is found.

As will be described in detail below, computer device 200 may perform certain operations relating to messages, including advertisements or videos, inserted into a content stream. Computer device 200 may perform these operations in response to processor 220 executing software instructions contained in a computer-readable medium, such as memory 260. A computer-readable medium may be defined as a non-transitory memory device. A memory device may include space within a single physical memory device or spread across multiple physical memory devices. The software instructions may be read into memory 260 from another computer-readable medium or from another device. The software instructions contained in memory 260 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of computer device 200, in other implementations, computer device 200 may include fewer components, different components, differently arranged components, or additional components than depicted in FIG. 2. Additionally or alternatively, one or more components of computer device 200 may perform functions described as being performed by one or more other components of computer device 200.

Figure 3A:
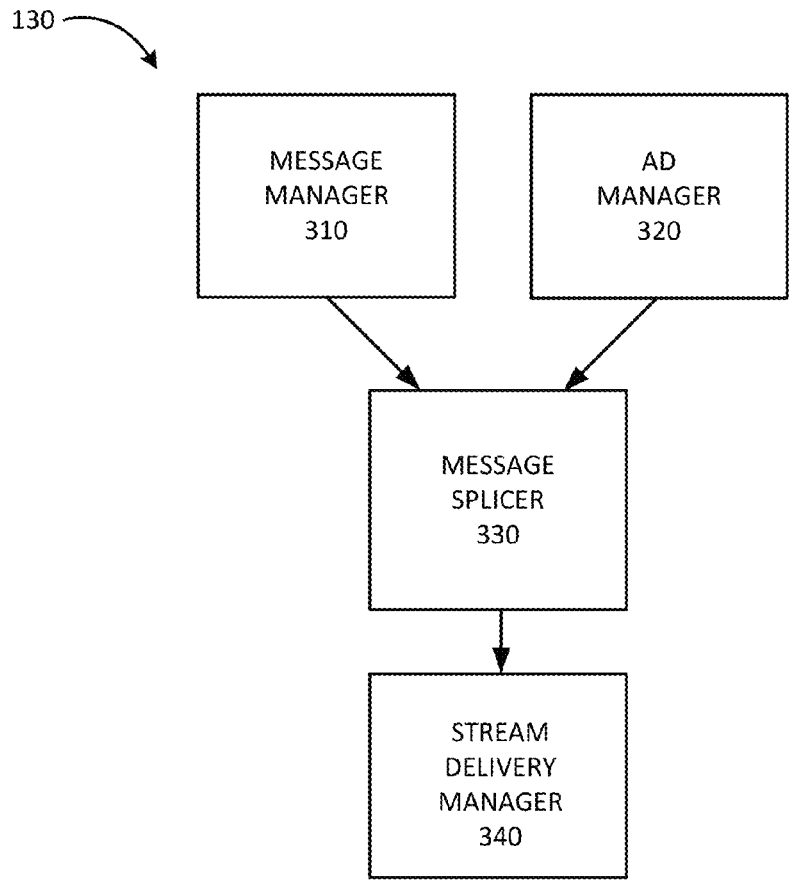
FIG. 3A is a diagram illustrating exemplary functional components of the content service system of FIG. 1.

FIG. 3A is a diagram of exemplary functional components of content service system 130. The functional components of content service system 130 may be implemented, for example, as a result of processor 220 executing instructions from memory 260. As shown in FIG. 3A, content service system 130 may include a message manager 310, an ad manager 320, a message splicer 330, and a stream delivery manager 340.

Message manager 310 may manage messages that are to be inserted into a content stream. For example, message manager 310 may receive a message from billing system 122, service system 124, customer managing system 126, or emergency messaging system 180, and may process the message based one or more parameters associated with the message. For example, if the message is intended for a customer not associated with a particular content service system 130, message manager 310 may drop the message. As another example, if message manager 310 receives multiple messages that are to be inserted into a content stream within a particular period of time, message manager 310 may determine a priority associated with each of the received message and may provide the messages to message splicer 310 in an order based on the determined priorities. As yet another example, if message manager 310 receives a message scheduled to be sent at a particular time, message manager 310 may store the message and may provide the message to message splicer 330 when a current time is within a particular range of the scheduled time.

Ad manager 320 may manage advertisements that are to be inserted into a content stream. For example, ad manager 320 may receive an advertisement from ad server 116 and may process the advertisement based on one or more parameters. For example, ad manager 320 may determine a priority associated with an advertisement and may provide the advertisement to message splicer 310 in an order based on the determined priority. An advertisement priority may be based, for example, on a bid associated with the advertisement. Thus, an advertisement associated with a higher bid price may be assigned a higher priority.

Message splicer 330 may splice a message, or an advertisement, into a content stream, such as a video stream. The operation of message splicer 330 is described below in more detail with reference to FIG. 3B.

Stream delivery manager 340 may deliver a content stream to NT 142. For example, stream delivery manager 340 may convert a video stream from a format associated with content delivery server 112 into a format associated with customer premises 140 or with mobile device 160. Stream delivery manager 340 may include an output buffer and may output content to NT 142 in segments (e.g., by outputting the content in HTTP streaming video segments).

Although FIG. 3A shows exemplary functional components of content service system 130, in other implementations, content service system 130 may include fewer functional components, different functional components, differently arranged functional components, or additional functional components than depicted in FIG. 3A. Additionally or alternatively, one or more functional components of content service system 130 may perform functions described as being performed by one or more other functional components of content service system 130.

Figure 3B:
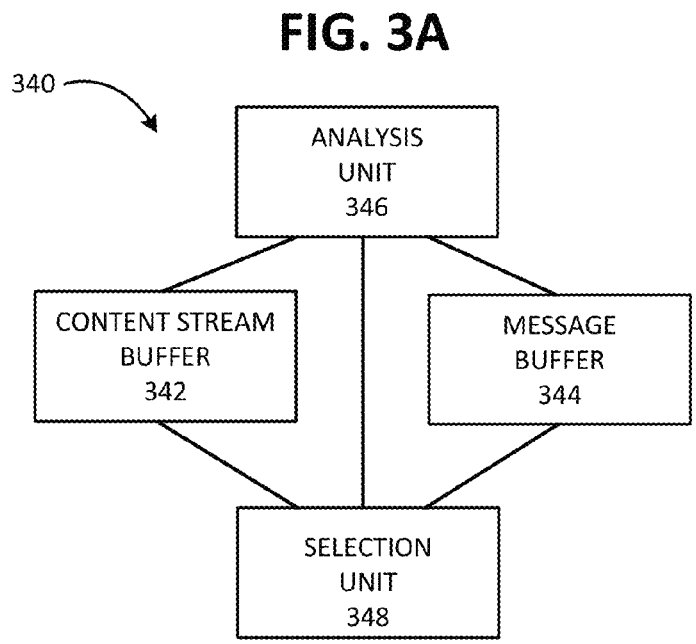
FIG. 3B is a diagram of exemplary functional components of the message splicer of FIG. 3.

FIG. 3B is a diagram of exemplary functional components of message splicer 340. As shown in FIG. 3B, message splicer 340 may include a content stream buffer 342, a message buffer 344, an analysis unit 346, and a selection unit 348.

Content stream buffer 342 may receive content (e.g., HTTP streaming video segments) and may temporarily store the content before the content is selected to be sent to customer premises 140 or to mobile device 160. Message buffer 344 may receive messages and/or advertisements and may temporarily store the messages and/or advertisements before the messages and/or advertisements are inserted into a content stream.

Analysis unit 346 may analyze a message and determine when to insert a message into a content stream. For example, analysis unit 346 may determine after which particular content segment to insert a particular message based on, for example, a length of the particular message, a scheduled time for the particular message, and a length of a content segment. Selection unit 348 may select a next segment that is to be sent customer premises 140 or to mobile device 160. For example, selection unit 348 may select either a content segment or a message (or advertisement) segment based on instructions received by analysis unit 346.

Although FIG. 3B shows exemplary functional components of message splicer 340, in other implementations, message splicer 340 may include fewer functional components, different functional components, differently arranged functional components, or additional functional components than depicted in FIG. 3B. Additionally or alternatively, one or more functional components of message splicer 340 may perform functions described as being performed by one or more other functional components of message splicer 340.

Figure 4:
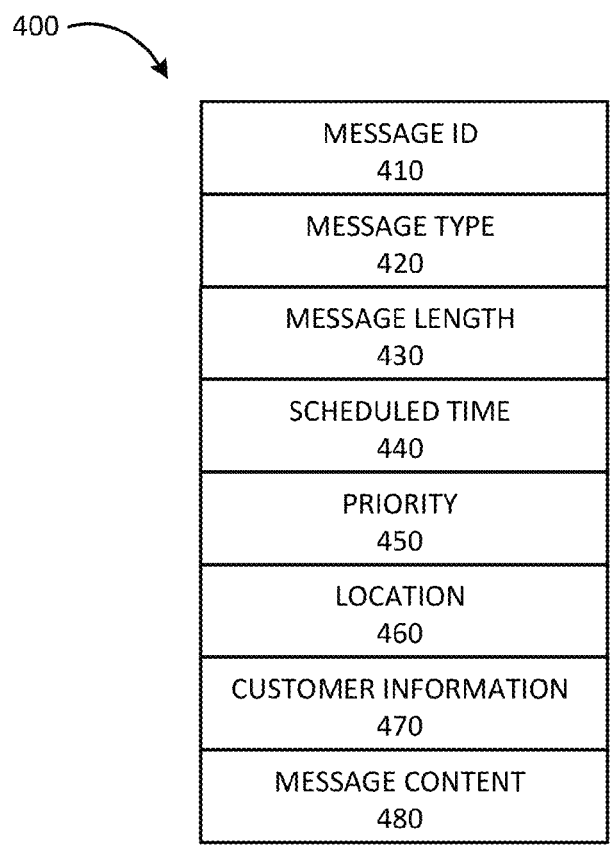
FIG. 4 is a diagram of exemplary fields of a message according to an implementation described herein.

FIG. 4 is a diagram of exemplary fields that may be included in a message 400 received by content service system 130. In one implementation, message 400 may be received via one or more Hypertext Transfer Protocol (HTTP) packets. In another implementation, message 400 may be received via one or more packets, frames, and/or cells associated with another protocol. As shown in FIG. 4, message 400 may include a message identification (ID) field 410, a message type field 420, a message length field 430, a scheduled time field 440, a priority field 450, a location field 460, a customer information field 470, and a message content field 480.

Message ID field 410 may include an identifier (e.g., string of characters) that uniquely identifies a message. Message type field 420 may include information identifying a particular message type. For example, message type field 420 may identify a message as an advertisement, a message from billing system 122, a message from service system 124, a message from another customer, a message from emergency messaging system 180, or another type of message. Additionally, message type field 420 may include additional information that relates to the particular message type. For example, if the message corresponds to an advertisement, message type field 420 may include information about a type of advertisement, which may be used to match the advertisement with a particular television channel or a particular television program.

Message length field 430 may include information about the length of the message. For example, message length field 430 may include information about the duration of the message in seconds, information about the duration of the message in terms of number of video segments, information about a size of the message (e.g., number of bytes), and/or any other information relating to the length of the message.

Scheduled time field 440 may include information about a scheduled time at which the message is to be played. For example, scheduled time field 440 may include information identifying that an advertisement is to be played at 1:30 PM.

Priority field 450 may include information identifying a priority of the message. For example, priority field 450 may include a priority level selected from a range of priority levels. As another example, priority field 450 may include a particular priority label (e.g., "urgent," "reminder," "emergency," etc.).

Location field 460 may include information about a location associated with the message. For example, an advertisement may correspond to a local advertisement directed to a particular geographic area.

Customer information field 470 may include information identifying one or more customers. For example, a billing reminder may be directed to a particular customer or to a group of customers. As another example, a software update maintenance message may be sent to customers associated with a particular software version installed on STB 144.

Message content 480 may include the content of the message. The content may include textual content, audio content, video content, and/or interactive content. For example, a billing reminder sent to STB 144 may include an interactive component that may enable a customer to pay a bill using remote control 146. For example, the customer may be able to use remote control 146 to enter a credit card number.

Although FIG. 4 shows exemplary fields that may be included in message 400, in other implementations, message 400 may include fewer fields, different fields, differently arranged fields, and/or additional fields than depicted in FIG. 4.

Figure 5:
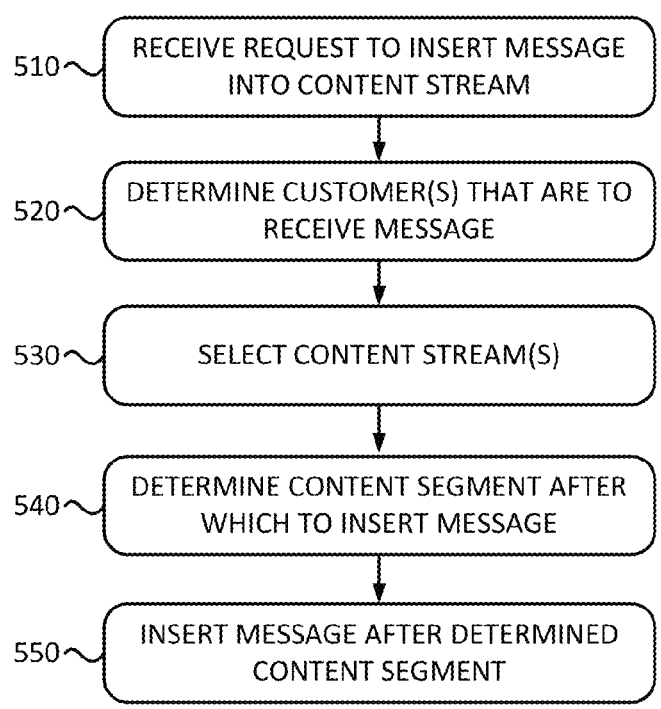
FIG. 5 is a flow chart of an exemplary process for inserting a message into a content stream according to an implementation described herein.

FIG. 5 is a flow chart of an exemplary process for inserting a message into a content stream according to an implementation described herein. In one implementation, the process of FIG. 5 may be performed by content service system 130. In other implementations, some or all of the process of FIG. 5 may be performed by another device or a group of devices separate from content service system 130 and/or including content service system 130.

The process of FIG. 5 may include receiving a request to insert a message into a content stream (block 510). For example, message manager 410 may receive a message from billing system 122, from service system 124, from customer messaging system 126, from emergency messaging system 180, or from another device or system. As another example, ad manager 420 may receive an advertisement from ad server 116.

One or more customers that are to receive the message may be determined (block 520). For example, message manager 410 may determine one or more customers that are to receive the message. As another example, ad manager 420 may determine one or more customers that are to receive the advertisement. In one example, the customers that are to receive the message or advertisement may be determined based on information included in message type field 420 of the message. In another example, the customers that are to receive the message or advertisement may be explicitly identified in customer information field 470 of the message. In yet another example, the customers that are to receive the message or advertisement may be determined by matching a location associated with the customers with a location identified in location field 460 of the message.

In another implementation, the customers that are to receive the message or advertisement may be determined based on other information. In yet another implementation, the message may be sent to all customers associated with a particular content office 110.

A content stream may be selected (block 530). For example, message splicer 330 may select a content stream for each customer that is to receive the message or advertisement based on one or more parameters, such as, for example, a message type associated with the message or advertisement and/or a priority associated with the message or advertisement (e.g., based on message type field 420 and/or priority field 450 of the message or advertisement). As an example, if the message corresponds to an emergency announcement, message splicer 330 may insert the message into each content stream being provided to a customer (e.g., into every television channel). As another example, if the message corresponds to an advertisement, the advertisement may be associated with a particular television channel and message splicer 330 may select the particular television channel as the content stream into which to insert the message.

A content segment after which to insert the message may be determined (block 540). For example, analysis unit 346 may determine a particular content segment after which the message is to be inserted, based on, for example, the time of the content stream at which to insert the message. Determining the particular content segment after which the message is to be inserted may be performed independently of any SCTE-35 specification message cues associated with the content stream. A process of selecting a particular content segment after which to insert the message is described below with reference to FIG. 6.

In another implementation, a particular content segment may be selected by analyzing the content stream. For example, analysis unit 346 may determine a location of the content stream at which to insert the message such that the message will reduce disruption of the customer's experience. For example, if a customer is watching a movie, the customers' experience may be less disrupted by the message if the message is sent to the customer during a scene change of the movie. Thus, in one implementation, analysis unit 346 may analyze the content stream to detect a scene change and may select as the particular content segment, after which to insert the message, a content segment that includes a scene change. In one example, a scene change may be detected using a scene change detection algorithm. In another example, a scene change may be detected based on metadata associated with the content stream.

The message may be inserted after the determined content segment (block 550). In one implementation, if the message is being inserted into an active content stream, the content stream may be paused. Pausing the content stream may refer to halting output of content segments while outputting message segments. For example, analysis unit 346 may instruct selection unit 348 to provide the message from message buffer 344 to stream delivery manager 340 after a particular content segment has been sent out by content service system 130. Sending of the content stream may be resumed after the message at the next content segment. For example, after the last segment of the message has been sent, analysis unit 346 may instruct selection unit 348 to resume providing content segments from content stream buffer 342 to stream delivery manager 340.

In another implementation, segments may be provided to customer premises 140 or to mobile device 160 through a playlist that lists locations of content segments in an order that the segments are to be reassembled and/or output. For example, content service system 130 may provide a playlist file to STB 144, personal computer 148, and/or mobile device 160, and STB 144, personal computer 148, and/or mobile device 160 may retrieve particular segments from content office 110 based on an order specified by the playlist file. Alternatively, the playlist file may be generated by content service system 130 and the segments may be retrieved by content service system 130 and provided to customer premises 140 and/or mobile device 160 in an order specified by the playlist file. Examples of playlist files may include an M3U8 file, an M3U file, a PLS file, an Advanced Stream Redirector (ASX) file, and/or any other type of playlist file.

Figure 6:
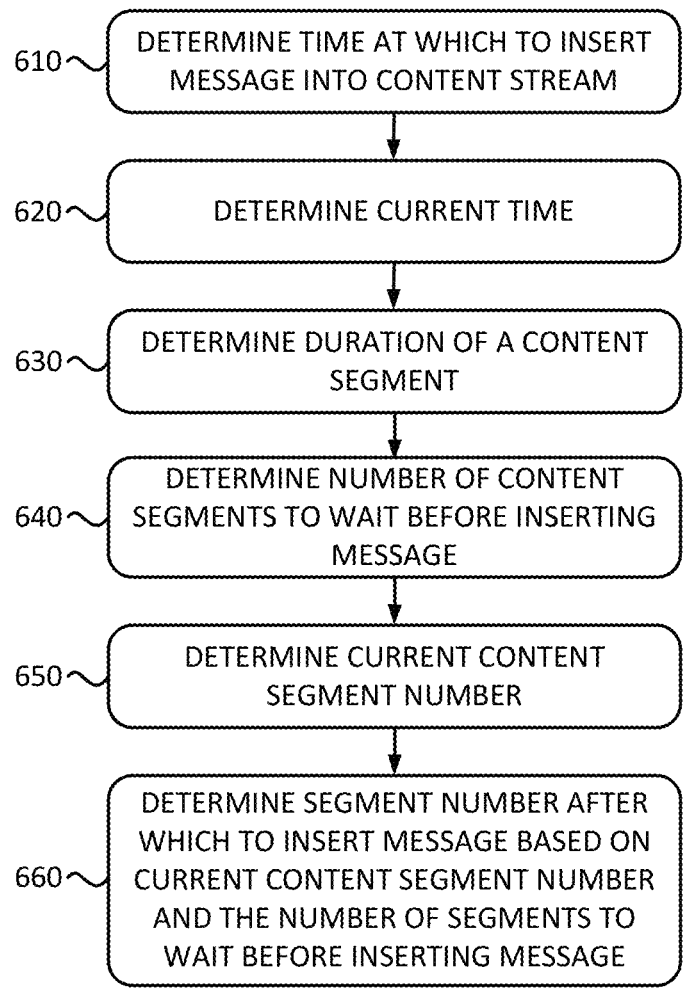
FIG. 6 is a flow chart of an exemplary process for determining a video segment after which a message is to be played according to an implementation described herein.

FIG. 6 is a flow chart of an exemplary process for determining a content segment number after which a message is to be inserted according to an implementation described herein. In one implementation, the process of FIG. 6 may be performed by content service system 130. In other implementations, some or all of the process of FIG. 6 may be performed by another device or a group of devices separate from content service system 130 and/or including content service system 130.

The process of FIG. 6 may include determining a time at which to insert a message into a content stream (block 610). For example, analysis unit 346 may determine when the message is to be played by accessing scheduled time field 440 of the message. As another example, the message may correspond to an advertisement and analysis unit 346 may be programmed for a commercial break at a particular time and may determine that the advertisement is to be played during the commercial break.

A current time may be determined (block 620). For example, analysis unit 346 may determine a current time. A duration of a content segment may be determined (block 630) and a number of content segments to wait before inserting the message may be determined (block 640). For example, if Sn corresponds to the number of segments to wait before inserting the message, if Tm corresponds to the time at which the message is to be inserted, if Tc corresponds to the current time, and if Sd correspond to the duration of a segment, Sn may be determined by:

$$Sn=(Tm-Tc)/Sd$$

A current content segment number may be determined (block 650). For example, analysis unit 346 may determine a segment number of the last content segment that has been selected by selection unit 348 to be provided to stream delivery manager 340. A segment number after which to insert the message may be determined based on the current content segment number and the number of segments to wait before inserting the message (block 660). For example, 5 nm corresponds to the segment number after which to insert the message and Scn corresponds to the current segment number, then 5 nm may be determined by:

$$Snm=Scn+Sn$$

FIGS. 7A-7D are diagrams illustrating a first example 700 of providing a message via a video stream according to an implementation described herein. Assume that an incoming video stream 710 is being received by content service system 130 and provided to customer premises 140. Incoming video stream 710 may be delivered using HTPP in segments and each segment chunk may carry video data corresponding to 10 seconds of video. Next segment 715 may be received at a time of 1:29:30. Further assume that ad manager 320 receives incoming message 720, which corresponds to an advertisement that is 30 seconds long and that is to be played at a time of 1:30.

Content service system 130 may determine that 30 seconds remain before the advertisement is to be played and that each segment is 10 seconds long. Therefore, content service system 130 may determine that the advertisement is to be played after three segments. Since the next segment is segment A, the advertisement may be inserted after segment C to generate video stream 730 outgoing to customer premises 140. The video stream may resume with segment D after the advertisement is inserted. FIG. 7B illustrates, accordingly, that television 145 may display a video stream (item 740), followed by the advertisement (item 750). After the advertisement is played, television 145 may continue playing the video stream at the next segment (item 760).

One way in which segments could be provided to customer premises 140 or to mobile device 160 is through a playlist that lists locations of content segments in an order that the segments are to be reassembled and/or output.

In one implementation, video stream 730 outgoing to customer premises 140 may be determined based on a playlist file. For example, content service system 130 may generate a playlist file and may provide segments to customer premises 140 based on the playlist file. Alternatively, a device associated with customer premises 140 may request segments from content service system 130 based on a playlist file received from content service system 130.

FIGS. 7C and 7D depict an example M3U playlist file 770 that may be associated with incoming video stream 710. As shown in FIG. 7C, M3U playlist file 770 may include header information 772 and a segment listing 774. Header information 772 may include information about video stream 710, such as, for example, a type of playlist file, a video stream identifier, and/or a maximum length of a segment. Segment listing 774 may list video segments in an order that the video segments are to be re-assembled and/or outputted into a video stream. Each listing may include a uniform resource identifier (URI) that identifies a location of a particular segment.

FIG. 7D depicts M3U playlist file 770 after incoming message 720 has been inserted. M3U playlist file 770 may now include message segments 776. Each one of message segments 776 may include a URI that identifies a location of a particular segment of the message. Thus, based on M3U playlist file 770 of FIG. 7D, a device may play segment A, followed by segment B, followed by segment C, followed by segment 1 of incoming message 720, followed by segment 2 of incoming message 720, followed by segment D, etc.

FIGS. 8A-8B are diagrams illustrating a second example 800 of providing a message via a video stream according to an implementation described herein. Assume that an incoming video stream 810 is being received by content service system 130 and provided to customer premises 140. On-demand video stream 810 may correspond to on-demand video content being received by a customer from on-demand server 114. Next segment 815 may be received at a time of 1:29:30. Further assume that message manager 310 receives incoming message 820, which corresponds to a billing reminder received from billing system 122. The billing system may be intended for the particular customer that is receiving the on-demand video stream 810.

The billing reminder message may not be associated with a particular time at which the message is to be played. Therefore, content service system 130 may need to determine an appropriate time at which to insert the message into on-demand video stream 810. Content service system 130 may identify an upcoming scene change in the video content. Providing a message within a particular time of a scene change from a first scene to a second scene may reduce disruption of a customer's experience. Analysis unit 346 may identify an upcoming scene change by analyzing video content segments stored in content stream buffer 342. In one example, analysis unit 346 may identify a scene change using one or more scene change detection algorithms. A scene change detection algorithm may, for example, track and analyze histograms of color or luminance in video frames, track and analyze changes in shapes in video frames, etc. In another example, analysis unit 346 may identify a scene change based on metadata included with the video stream. For example, the metadata may include information about scenes of the video content. In yet another example, analysis unit 346 may use a different technique to identify a scene change.

Assume that analysis unit 346 identified an upcoming scene change 816 in segment C. Analysis unit may, therefore, insert the billing reminder message between segment B and segment C to generate video stream 830 outgoing to customer premises 140. FIG. 8B illustrates, accordingly, that television 145 may display a video stream displaying a first scene 840. After the first scene ends, television 145 may display a billing reminder 850 to the customer. After the billing reminder is played, television 145 may resume the video stream, displaying a second scene 860.

In another implementation, content service system 130 may use a different criterion to determine when to insert the message into the on-demand video stream 810. For example, content service system 130 may hold the message in message buffer 344 and may wait until the customer initiates a new on-demand video stream or may insert the message at the end of an on-demand video stream.

Figure 9:
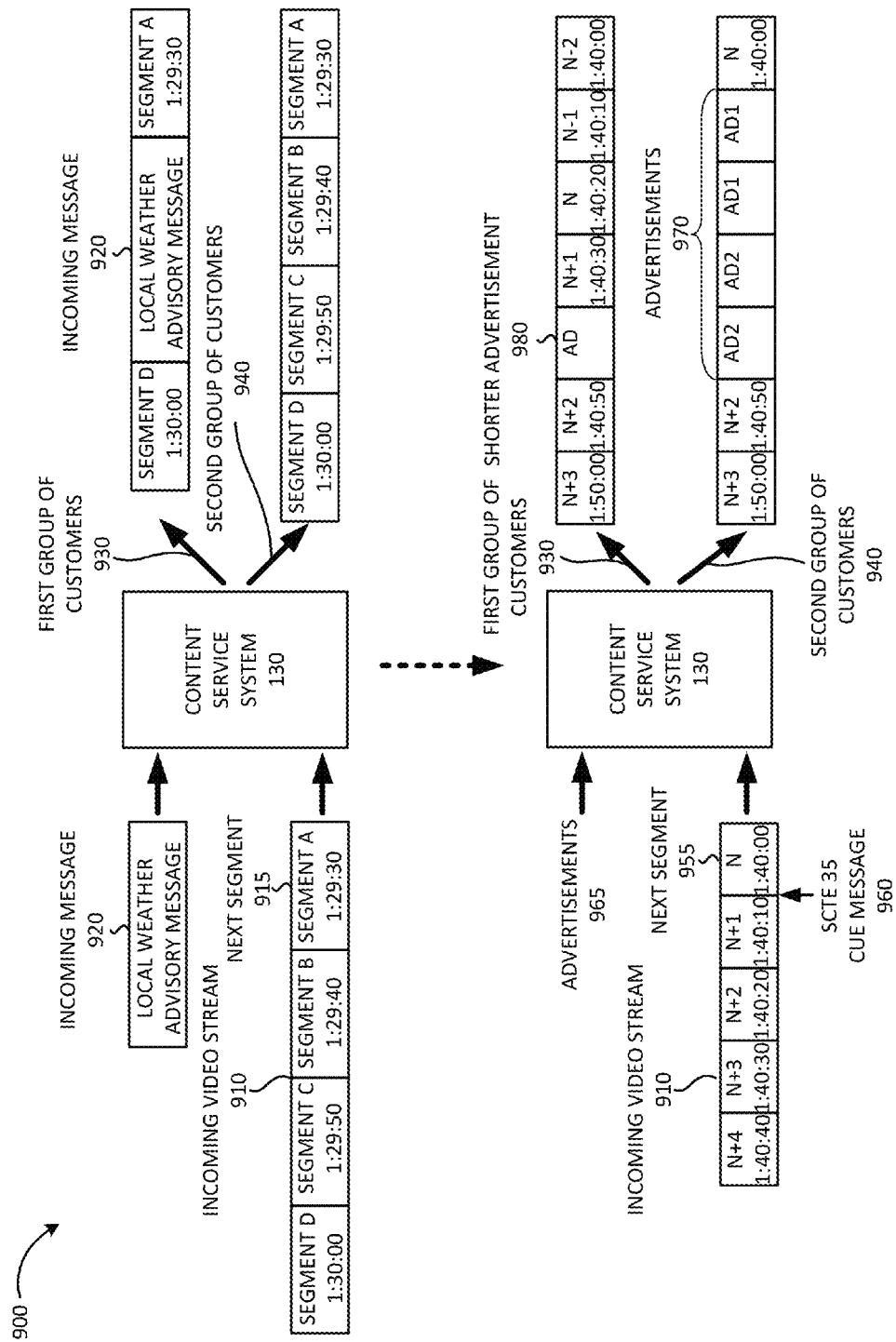
FIG. 9 is a diagram of a third exemplary of providing a message via a video stream according to an implementation described herein.

FIG. 9 is a diagram of a third example 900 of providing a message via a video stream according to an implementation described herein. Example 900 illustrates a situation in which a first group of customers serviced by content service system 130 receives a message while a second group of customers does not receive the message. Assume that an incoming video stream 910 is being received by content service system 130 and provided to customer premises 140. Incoming video stream 910 may be a video stream of a live sports game being broadcast on a particular television channel. Next segment 915 may be received at a time of 1:29:30.

Further assume that message manager 310 receives incoming message 920, which corresponds to a local weather advisory message from emergency messaging system 180. The local advisory message is to be sent to customers within a particular geographic area. Content service system 130 may be servicing the particular geographic area in addition to other geographic areas. Thus, content service system 130 may send incoming message 920 to a first group of customers 930, associated with the particular geographic area, and may not send incoming message 920 to a second group of customers 940, not associated with the particular geographic area. As a result, after receiving incoming message 920, first group of customers 930 may receive incoming video stream 910 at a delay in relation to second group of customers 940.

While in one embodiment, content service system 130 may simply skip ahead three segments to catch up to incoming video stream 910 for first group of customers 930, in another embodiment, content service system 130 may correct the delay at a later time. For example, assume that ten minutes later, after next segment 955, incoming video stream 910 includes an SCTE 35 "can override" message 960, indicating that the next four segments include advertisements provided by content provider 170. The SCTE 35 "can override" message 960 may indicate that the advertisements may be overridden by local advertisements.

Content service system 130 may insert advertisements into incoming video stream 910 in such a way as to eliminate the delay associated with the first group of customers 930. For example, content service system 130 may insert advertisements 970 into an outgoing video stream to second group of customers 940. Advertisements 970 may correspond to a length of 4 segments. Content service system 130 may determine a length of delay introduced into the video stream by accessing message length field 430 of the inserted message. As in this case the delay between the video stream to first group of customers 930 and to second group of customers 940 corresponds to three segments, content service system 130 may continue to output segments from incoming video stream 910 for three more segments. Content service system 130 may then select a shorter advertisement 980 of one segment in length and insert the shorter advertisement after segment N+1. For example, analysis unit 346 may compare the lengths of advertisements stored in message buffer 344 or managed by ad manager 320 (e.g., by accessing message length field 430 of the advertisements) to the delay between the video stream being sent to first group of customers 930 and second group of customers 940. After inserting shorter advertisement 980, content service system 130 may continue with the next segment, which may be segment N+2. At this point, the video stream being sent to first group of customers 930 and the video stream being sent to second group of customers 940 may be synchronized, such that first group of customers 930 and second group of customers 940 are both receiving the same segment number at substantially the same time.

The foregoing description provides illustration and description, but is not intended to be exhaustive or to limit the implementations to the precise form disclosed. Modifications and variations are possible in light of the above teachings or may be acquired from practice of the embodiments.

While series of blocks have been described with respect to FIGS. 5 and 6, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a server device, the method comprising:
   receiving, by the server device, a video stream, wherein the video stream is divided into a sequence of video segments and includes one or more cue messages, and wherein the video stream is being sent to a customer device;
   receiving, by the server device, a request to insert a message into the video stream;
   determining, by the server device and independently of the one or more cue messages, a particular video segment after which to insert the message into the video stream, responsive to detecting a scene change between the particular video segment and a next video segment in the sequence of video segments based on histograms of at least one of color or luminance in the particular video segment;
   pausing, by the server device, the video stream after the particular video segment;
   inserting, by the server device, the message into the video stream after the particular video segment;
   sending, by the server device, the message in the video stream to the customer device; and
   resuming, by the server device, sending of the video stream to the customer device with the next video segment.

2. The method of claim 1, wherein the message includes an advertisement.

3. The method of claim 1, wherein the message includes one or more of:
   a message from a billing system, wherein the message comprises a billing reminder that is not associated with a particular time in the video stream for inserting the message;
   a message from a customer; or
   a message from an emergency messaging system.

4. The method of claim 1, wherein the determining a particular video segment after which to insert the message into the video stream includes:
   determining a time at which to insert the message into the video stream;
   determining a duration of a video segment;
   determining a current video segment; and
   determining the particular video segment based on the time at which to insert the message, the duration of a video segment, and the current video segment.

5. The method of claim 1, further comprising:
   detecting another scene change between the particular video segment and the next video segment based on changes in shapes in the particular video segment and the next video segment.

6. The method of claim 1, further comprising:
   receiving a plurality of video streams;
   determining one or more customers that are to receive the message;
   determining at least one of the plurality of video streams that is associated with the determined one or more customers; and
   inserting the message into the at least one of the plurality of video streams.

7. The method of claim 6, wherein the determining one or more customers that are to receive the message includes:
   identifying a location associated with the message; and
   determining the one or more customers that are to receive the message based on the identified location.

8. The method of claim 1, wherein the sending the message in the video stream to the customer device includes sending the message in the video stream to a first plurality of customer devices, the method further comprising:
sending the video stream to a second plurality of customer devices without inserting the message into the video stream sent to the second plurality of customer devices; and
synchronizing sending of the video stream to the first plurality of customer devices and the sending of the video stream to the second plurality of customer devices, wherein the synchronizing causes a same video segment to be sent to the first plurality of customer devices and to the second plurality of customer devices at a same time.

9. A system comprising:
one or more server devices configured to:
receive a video stream, wherein the video stream is divided into a sequence of video segments and includes one or more cue messages, and wherein the video stream is being sent to a customer device;
receive a request to insert a message into the video stream;
determine, independently of the one or more cue messages, a particular video segment after which to insert the message into the video stream, responsive to detecting a scene change between the particular video segment and a next video segment in the sequence of video segments based on histograms of at least one of color or luminance in the particular video segment;
pause the video stream after the particular video segment;
insert the message into the video stream after the particular video segment;
send the message in the video stream to the customer device; and
resume sending of the video stream to the customer device with the next video segment.

10. The system of claim 9, wherein the video stream is received from at least one of:
a content delivery server device that delivers a television broadcast to the one or more server devices;
an on-demand server device that delivers on-demand video content to the one or more server devices; or
an interactive server device that provides interactive video content to the one or more server devices.

11. The system of claim 9, wherein the customer device includes at least one of:
a set-top box;
a personal computer; or
a mobile communication device.

12. The system of claim 9, wherein the message is received from at least one of:
an advertisement server device that provides advertisements to the one or more server devices;
a billing system that generates bills for customer accounts associated with the one or more server devices;
a service system that provides service or maintenance for customer accounts associated with the one or more server devices;
a customer messaging system that enables a first customer associated with the one or more server devices to send a message to a second customer associated with the one or more server devices; or
an emergency messaging system that provides emergency messages or public announcements to the one or more server devices.

13. The system of claim 9, wherein, when the one or more server devices determine the particular video segment after which to insert the message into the video stream, the one or more server devices are further configured to:
determine a time at which to insert the message into the video stream;
determine a duration of a video segment;
determine a current video segment; and
determine the particular video segment based on the time at which to insert the message, the duration of a video segment, and the current video segment.

14. The system of claim 9, wherein the one or more server devices are further configured to:
detect another scene change between the particular video segment and the next video segment based on changes in shapes in the particular video segment and the next video segment.

15. The system of claim 9, wherein the one or more server devices are further configured to:
receive a plurality of video streams;
determine one or more customers that are to receive the message;
determine at least one of the plurality of video streams that is associated with the determined one or more customers; and
insert the message into the at least one of the plurality of video streams.

16. The system of claim 9, wherein the one or more server devices are configured to send the message in the video stream to a first plurality of customer devices, and wherein the one or more server devices are further configured to:
send the video stream to a second plurality of customer devices without inserting the message into the video stream sent to the second plurality of customer devices; and
synchronize sending of the video stream to the first plurality of customer devices and the sending of the video stream to the second plurality of customer devices, wherein the synchronizing causes a same video segment to be sent to the first plurality of customer devices and to the second plurality of customer devices at a same time.

17. A non-transitory computer-readable medium storing instructions executable by one or more processors, the non-transitory computer-readable medium comprising:
one or more instructions to receive a video stream, wherein the video stream is divided into a sequence of video segments and includes one or more cue messages, and wherein the video stream is being sent to a customer device;
one or more instructions to receive a request to insert a message into the video stream;
one or more instructions to determine, independently of the one or more cue messages, a particular video segment after which to insert the message into the video stream, responsive to detecting a scene change between the particular video segment and a next video segment in the sequence of video segments based on histograms of at least one of color or luminance in the particular video segment;
one or more instructions to pause the video stream after the particular video segment;
one or more instructions to insert the message into the video stream after the particular video segment;
one or more instructions to send the message in the video stream to the customer device; and
one or more instructions to resume sending of the video stream to the customer device with the next video segment.

18. The non-transitory computer-readable medium of claim 17, wherein the one or more instructions to determine the particular video segment after which to insert the message into the video stream include:
    one or more instructions to determine a time at which to insert the message into the video stream;
    one or more instructions to determine a duration of a video segment;
    one or more instructions to determine a current video segment; and
    one or more instructions to determine the particular video segment based on the time at which to insert the message, the duration of a video segment, and the current video segment.

19. The non-transitory computer-readable medium of claim 17, wherein the one or more instructions to determine the particular video segment after which to insert the message into the video stream include:
    one or more instructions to detect another scene change between the particular video segment and the next video segment based on changes in shapes in the particular video segment and the next video segment.

20. The non-transitory computer-readable medium of claim 17, wherein the one or more instructions to determine the particular video segment after which to insert the message into the video stream include:
    one or more instructions to detect a customer initiation of another video stream.

* * * * *